(12) United States Patent
Morota et al.

(10) Patent No.: US 7,308,256 B2
(45) Date of Patent: Dec. 11, 2007

(54) MOBILE COMMUNICATION TERMINAL, INFORMATION PROCESSING APPARATUS, RELAY SERVER APPARATUS, INFORMATION PROCESSING SYSTEM, AND INFORMATION PROCESSING METHOD

(75) Inventors: Satoru Morota, Yokohama (JP); Yasutaka Urakawa, Yokohama (JP); Tatsuya Kato, Yokohama (JP); Kenji Ishii, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 348 days.

(21) Appl. No.: 10/373,731

(22) Filed: Feb. 27, 2003

(65) Prior Publication Data

US 2003/0162575 A1 Aug. 28, 2003

(30) Foreign Application Priority Data

Feb. 28, 2002 (JP) .......................... P2002-054243

(51) Int. Cl.
*H04M 3/00* (2006.01)
*H04K 1/00* (2006.01)

(52) U.S. Cl. ................. 455/418; 455/556.1; 455/556.2; 455/557; 455/566; 455/550.1; 455/414.1; 455/419; 713/182; 713/200; 709/224; 709/229

(58) Field of Classification Search ................. 455/566, 455/550.1, 557, 410, 411, 403, 418, 419, 455/556.1, 556.2; 713/188, 200, 182, 201; 709/224, 229

See application file for complete search history.

(56) References Cited

U.S. PATENT DOCUMENTS

| | | | |
|---|---|---|---|
| 5,802,275 A * | 9/1998 | Blonder ...................... 713/200 |
| 5,889,943 A | 3/1999 | Ji et al. |
| 5,918,008 A * | 6/1999 | Togawa et al. ............. 713/200 |
| 6,088,803 A * | 7/2000 | Tso et al. ................... 713/201 |
| 6,292,833 B1 * | 9/2001 | Liao et al. .................. 709/229 |
| 6,401,210 B1 * | 6/2002 | Templeton .................. 713/200 |
| 6,721,721 B1 * | 4/2004 | Bates et al. .................... 707/1 |
| 6,757,830 B1 * | 6/2004 | Tarbotton et al. ........... 713/188 |
| 6,763,466 B1 * | 7/2004 | Glover ....................... 713/200 |

(Continued)

FOREIGN PATENT DOCUMENTS

JP 11-167487 12/1997

(Continued)

OTHER PUBLICATIONS

Derwent Publications, XP-002262806, KR 2000-002953, Jan. 10, 2002.

(Continued)

*Primary Examiner*—Lester G. Kincaid
*Assistant Examiner*—Khai Nguyen
(74) *Attorney, Agent, or Firm*—Oblon, Spivak, McClelland, Maier & Neustadt, P.C.

(57) ABSTRACT

A cellular phone 100 is provided with a data transmitter 102, a detection result receiver 103, and a virus management information storage 104. The data transmitter 102 transmits data to a virus detecting apparatus 20. The detection result receiver 103 receives as virus management information a result of detection on whether the data transmitted by the data transmitter 102 includes a computer virus. The virus management information storage 104 stores the data and the virus management information about the data in association with each other.

8 Claims, 10 Drawing Sheets

U.S. PATENT DOCUMENTS

| | | |
|---|---|---|
| 6,782,510 B1 * | 8/2004 | Gross et al. ................ 715/533 |
| 6,792,543 B2 * | 9/2004 | Pak et al. .................... 726/24 |
| 6,842,861 B1 * | 1/2005 | Cox et al. ................... 713/188 |
| 7,043,634 B2 * | 5/2006 | Wolff et al. ................ 713/165 |
| 2002/0124181 A1 * | 9/2002 | Nambu ....................... 713/200 |
| 2003/0070087 A1 * | 4/2003 | Gryaznov ................... 713/201 |
| 2003/0105973 A1 * | 6/2003 | Liang et al. ................ 713/200 |
| 2004/0083384 A1 * | 4/2004 | Hypponen .................. 713/200 |
| 2004/0127195 A1 * | 7/2004 | An ............................. 455/410 |
| 2005/0005160 A1 * | 1/2005 | Bates et al. ................ 713/200 |
| 2005/0086499 A1 * | 4/2005 | Hoefelmeyer et al. ...... 713/188 |

FOREIGN PATENT DOCUMENTS

| | | |
|---|---|---|
| KR | 2002-0002953 | 1/2002 |
| WO | WO 01/33889 | 5/2001 |

OTHER PUBLICATIONS

Noriyuki Kitaura, "Norton Works 2002 Application Guide", Japan, Ohmsha, Ltd., Jan. 23, 2002, First Edition, (Book No. 200300014001), pp. 264-274 (with marked-up pp. 270-274 and English translation).

* cited by examiner

Fig.5

| DATA NAME | VIRUS MANAGEMENT INFORMATION |
|---|---|
| Web PAGE | OK |
| Java(R) PROGRAM 1 | NG |
| Java(R) PROGRAM 2 | OUTSTANDING |

104

MOBILE COMMUNICATION TERMINAL, INFORMATION PROCESSING APPARATUS, RELAY SERVER APPARATUS, INFORMATION PROCESSING SYSTEM, AND INFORMATION PROCESSING METHOD

BACKGROUND OF THE INVENTION

1. Field of the Invention

The present invention relates to a mobile communication terminal, an information processing apparatus, a relay server apparatus, an information processing system, and an information processing method.

2. Related Background Art

Recent development is outstanding in the information communication technology and our daily lives nowadays in information society are becoming increasingly convenient. For example, the spread of the Internet facilitated download and utilization of useful application programs and data files in terminal equipment such as personal computers and the like.

However, information downloaded through the Internet into the terminal equipment is not always only useful application programs or data. Namely, computer viruses to destroy the useful application programs and data often invade the terminal equipment through the Internet.

An example of the techniques of detecting whether a computer virus invaded the terminal equipment is the computer virus detection technology of a pattern matching method. In this technology, a server apparatus transmits a database storing characteristic data strings (hereinafter referred to as pattern data) included in computer viruses, to the terminal equipment, the database is stored in the terminal equipment, and a comparison is made between application programs and data also stored in the terminal equipment, and the foregoing pattern data. As a consequence, if an application program or data includes the foregoing pattern data, it will be determined that the application program or data includes a computer virus. In use of the computer virus detection technology of the pattern matching method, it is necessary to update the database on occasions to up-to-date data, in order to raise the detection probability of computer virus. Accordingly, when a new computer virus is found, the server apparatus sends characteristic pattern data included in the computer virus, to the terminal equipment, and the database on the terminal equipment is then updated.

SUMMARY OF THE INVENTION

However, the following problem was encountered when the conventional technology described above was applied to the detection of computer viruses in the mobile communication terminals like cellular phones. Namely, the mobile communication terminals have lower memory capacity and CPU performance than such terminal equipment as the personal computers and the like. Therefore, it is difficult for the mobile communication terminals to store the entire database and to exhaustively compare application programs and data therein with all the pattern data included in the database. In addition, the terminal equipment such as the personal computers is often connected to the server apparatus by wire links, whereas the mobile communication terminals are connected to the server apparatus by radio links. Accordingly, a large amount of radio resources will be consumed if the entire database is transmitted from the server apparatus to the mobile communication terminals. For these reasons, the use of the above conventional technology did not allow efficient detection of computer viruses for data used in the mobile communication terminals.

The present invention has been accomplished to solve the above problem and an object of the present invention is therefore to provide a mobile communication terminal, an information processing apparatus, a relay server apparatus, an information processing system, and an information processing method enabling efficient detection of computer viruses for data used in mobile communication terminals.

In order to solve the above problem, a mobile communication terminal according to the present invention is a mobile communication terminal comprising: storage means for storing data (including application programs and data files), and virus management information indicating whether the data includes a computer virus, in association with each other; and control means for controlling access to the data stored in the storage means, based on the virus management information stored in the storage means.

In order to solve the above problem, an information processing method according to the present invention is an information processing method of processing data, the information processing method comprising: a storage step wherein a mobile communication terminal stores data, and virus management information indicating whether the data includes a computer virus, in association with each other in storage means; and a control step wherein the mobile communication terminal controls access to the data stored in the storage means, based on the virus management information stored in the storage means.

According to these aspects of the invention, the access to the data stored in the storage means is controlled on the basis of the virus management information. Namely, the mobile communication terminal denies access to data whose virus management information indicates inclusion of a computer virus or to data whose virus management information indicates that a process of detecting whether a computer virus is included is outstanding. In contrast to it, the mobile communication terminal permits access to data whose virus management information indicates that no computer virus is included. Accordingly, data infected with a computer virus or data possibly infected is prevented from being retrieved by access. As a consequence, it is feasible to prevent the spread of computer viruses.

Preferably, the mobile communication terminal according to the present invention is configured to further comprise transmitting means for transmitting data to an information processing apparatus; and receiving means for receiving a result of detection on whether the data transmitted by the transmitting means includes a computer virus, as virus management information from the information processing apparatus; and so that the storage means stores the data transmitted by the transmitting means, and the virus management information about the data, received by the receiving means, in association with each other.

Preferably, an information processing apparatus according to the present invention is configured to comprise receiving means for receiving data transmitted from a mobile communication terminal; detecting means for detecting whether the data received by the receiving means includes a computer virus; and transmitting means for transmitting a result of detection by the detecting means to the mobile communication terminal.

Preferably, an information processing system according to the present invention is configured to comprise the above-stated mobile communication terminal and the above-stated information processing apparatus; and so that communication is performed between the mobile communication terminal and the information processing apparatus.

Preferably, the information processing method according to the present invention is arranged to further comprise a data transmitting step wherein the mobile communication terminal transmits data to an information processing apparatus; a data receiving step wherein the information processing apparatus receives the data transmitted in the data transmitting step; a detecting step wherein the information processing apparatus detects whether the data received in the data receiving step includes a computer virus; a detection result transmitting step wherein the information processing apparatus transmits a result of detection in the detecting step to the mobile communication terminal; and a virus management information receiving step wherein the mobile communication terminal receives the result of detection transmitted in the detection result transmitting step, as virus management information from the information processing apparatus; and so that in the storage step, the mobile communication terminal stores the data transmitted in the data transmitting step, and the virus management information about the data, received in the virus management information receiving step, in association with each other in the storage means.

According to these aspects of the invention, the mobile communication terminal transmits data to the information processing apparatus and receives as the virus management information the result of the detection on whether the data transmitted includes a computer virus. Namely, the information processing apparatus performs the detection of computer viruses about the data used in the mobile communication terminal. Therefore, the mobile communication terminal does not have to perform the reception, storage, and comparison of the pattern data involving heavy processing loads. As a consequence, it is feasible to efficiently perform the detection of computer viruses for the data used in the mobile communication terminal. The mobile communication terminal stores data as a target for detection of computer viruses and the virus management information about the data in association with each other. Accordingly, the mobile communication terminal can easily and quickly identify whether a computer virus is present in the data used in the mobile communication terminal.

More preferably, the mobile communication terminal according to the present invention is configured to further comprise transmitting means for transmitting a data transmission request to a server apparatus; and receiving means for receiving a result of detection on whether data requested by the transmission request from the transmitting means includes a computer virus, as virus management information along with the data from a relay server apparatus; and so that the storage means stores the data received by the receiving means, and the virus management information about the data in association with each other.

More preferably, a relay server apparatus according to the present invention is configured to comprise receiving means for receiving data transmitted from a server apparatus; detecting means for detecting whether the data received by the receiving means includes a computer virus; and transmitting means for transmitting a result of detection by the detecting means to a mobile communication terminal. The mobile communication terminal can definitely determine whether the virus detection was completed for the data received from the relay server apparatus, based on whether it can receive the detection result.

More preferably, an information processing system according to the present invention is configured to comprise the above-stated mobile communication terminal and the above-stated relay server apparatus; and so that communication is performed between the mobile communication terminal and the relay server apparatus.

More preferably, the information processing method according to the present invention is configured to further comprise a data transmission request transmitting step wherein the mobile communication terminal transmits a data transmission request to a server apparatus; a data transmitting step wherein the server apparatus transmits data to a relay server apparatus in response to the data transmission request; a data receiving step wherein the relay server apparatus receives the data transmitted in the data transmitting step; a detecting step wherein the relay server apparatus detects whether the data received in the data receiving step includes a computer virus; a detection result transmitting step wherein the relay server apparatus transmits a result of detection in the detecting step along with the data received in the data receiving step, to the mobile communication terminal; and a virus management information receiving step wherein the mobile communication terminal receives the result of detection transmitted in the detection result transmitting step, as virus management information along with the data from the relay server apparatus; and so that in the storage step, the mobile communication terminal stores the data received in the virus management information receiving step, and the virus management information about the data in association with each other in the storage means.

According to these aspects of the invention, the mobile communication terminal receives as the virus management information the result of the detection on whether the received data includes a computer virus, on the occasion of receiving the data from the server apparatus. Namely, the relay server apparatus performs the detection of computer viruses for the data used in the mobile communication terminal. Accordingly, the mobile communication terminal does not have to perform the reception, storage, and comparison of pattern data involving heavy processing loads. As a result, the detection of computer viruses can be efficiently performed for the data used in the mobile communication terminal. The mobile communication terminal stores the data as a target for detection of computer viruses and the virus management information about the data in association with each other in the storage means. Therefore, the mobile communication terminal can easily and quickly identify whether a computer virus is present in the data used in the mobile communication terminal, by referring to the data stored in the storage means.

More preferably, in the mobile communication terminal according to the present invention, the virus management information includes information indicating that a process of detecting whether the data includes a computer virus is outstanding.

More preferably, in the information processing method according to the present invention, the virus management information includes information indicating that a process of detecting whether the data includes a computer virus is outstanding.

According to these aspects of the invention, the virus management information includes the information indicating that the process of detecting whether a computer virus is included in the data used in the mobile communication terminal is outstanding. Accordingly, the mobile communication terminal can readily identify that whether a computer virus is present in the data used in the mobile communication terminal is undetermined.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a configuration diagram of the virus management information storage.

DESCRIPTION OF THE PREFERRED EMBODIMENTS

First Embodiment

An information processing system according to the first embodiment of the present invention will be described. The information processing system according to the present embodiment comprises a mobile communication terminal, an information processing apparatus, and a relay server apparatus according to the present invention.

Figure 1:
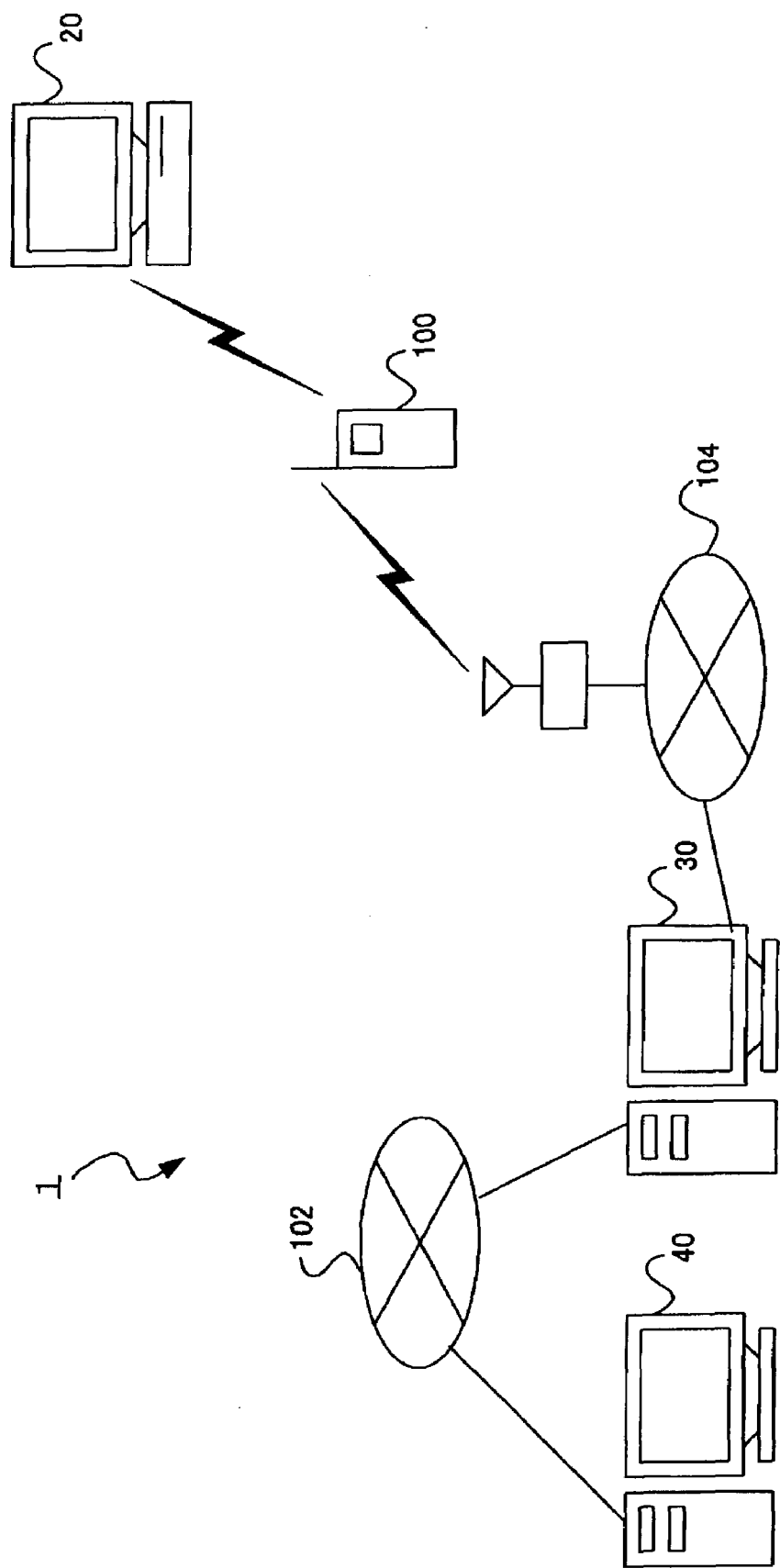
FIG. 1 is a hardware configuration diagram of the information processing system.

First, a configuration of the information processing system according to the present embodiment will be described. FIG. 1 is a hardware configuration diagram of the information processing system according to the present embodiment. The information processing system 1 according to the present embodiment comprises a cellular phone 100 (mobile communication terminal), a virus detecting apparatus 20 (information processing apparatus), a relay server apparatus 30, and a server apparatus 40.

The cellular phone 100 is able to perform short-range wireless communication with the virus detecting apparatus 20. The available short-range communication techniques include, for example, USB (Universal Serial Bus), Bluetooth (registered trademark), IrDA, and so on. The cellular phone 100 is connected through mobile communication network 104 to the relay server apparatus 30 and they are able to perform data communication with each other. Furthermore, the relay server apparatus 30 is connected through information communication network 102 to the server apparatus 40 and they are able to perform data communication with each other.

Figure 2:
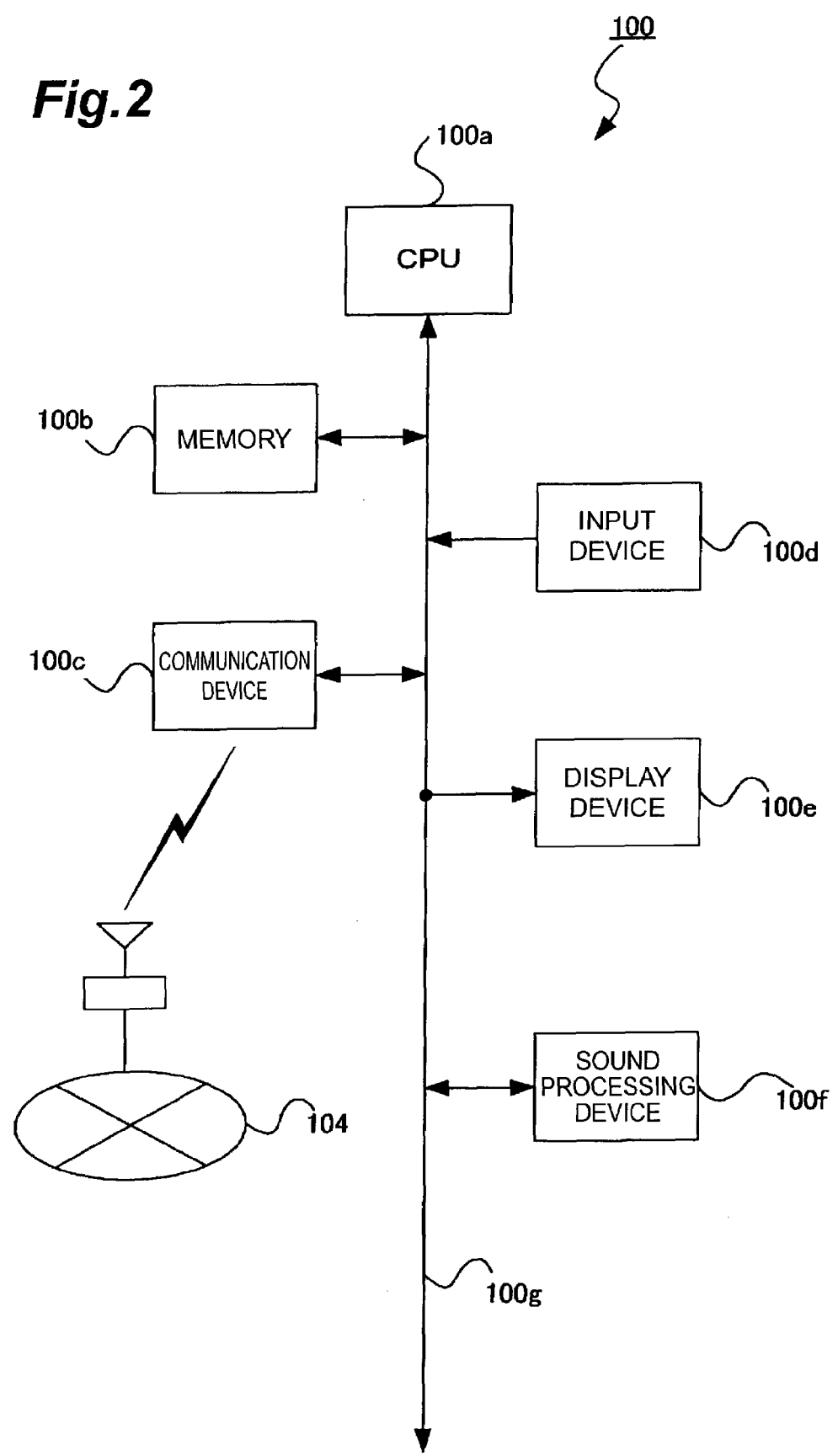
FIG. 2 is a hardware configuration diagram of the cellular phone.

Next, a configuration of the cellular phone according to the present embodiment will be described. FIG. 2 is a hardware configuration diagram of the cellular phone 100. The cellular phone 100 comprises a CPU 100a, a memory 100b such as a semiconductor memory or the like, a communication device 100c for transmission and reception of data to and from the relay server apparatus 30, an input device 100d such as operation buttons or the like, a display device 100e such as LCD (Liquid Crystal Display) or EL (Electro Luminescence), and a sound processing device 100f such as a microphone, a speaker, and so on. The CPU 100a, memory 10b, communication device 100c, input device 10d, display device 100e, and sound processing device 100f each are connected through bus 100g so as to be able to perform transmission and reception of data between them.

Figure 3:
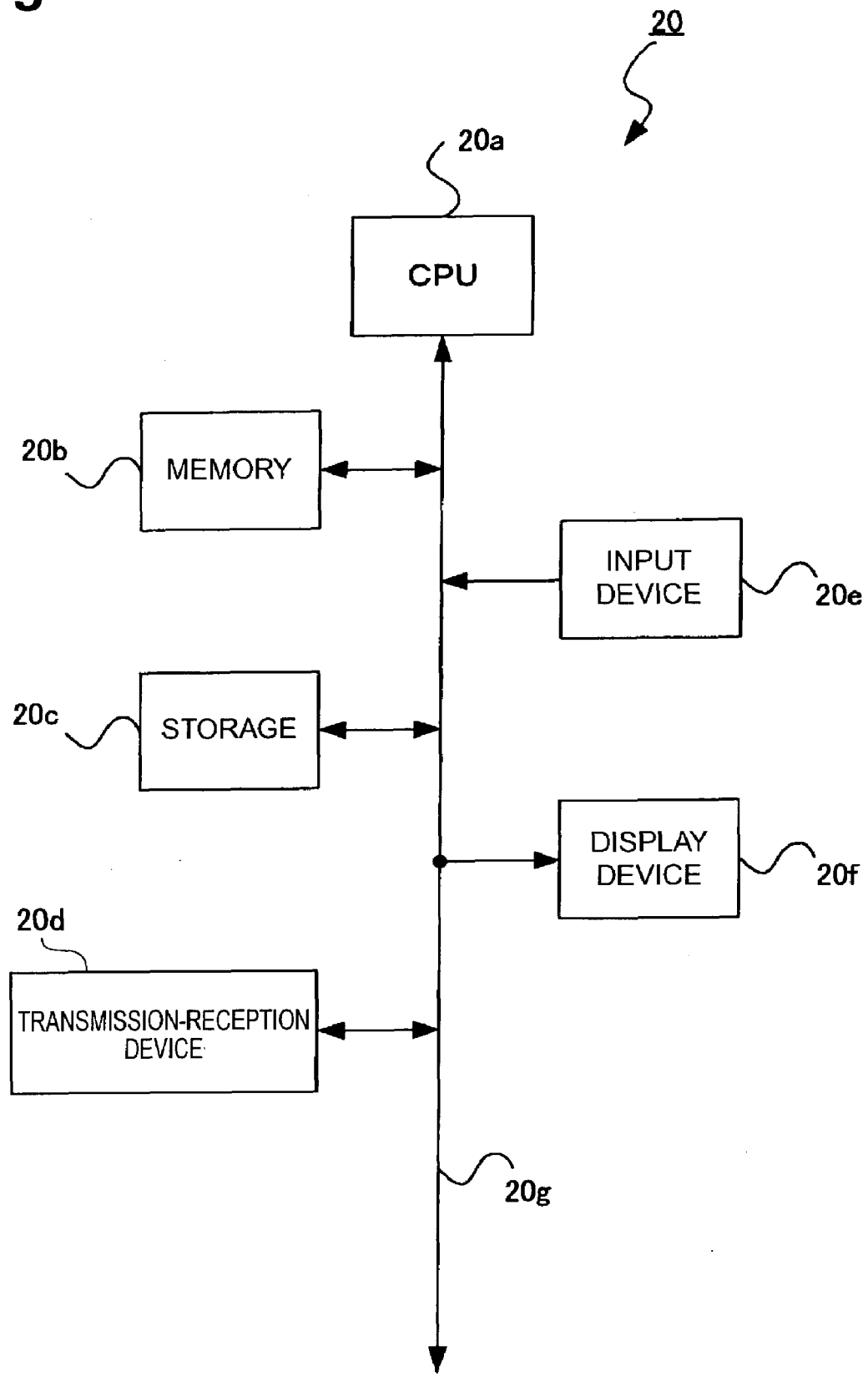
FIG. 3 is a hardware configuration diagram of the virus detecting apparatus.

A configuration of the virus detecting apparatus according to the present embodiment will be described. FIG. 3 is a hardware configuration diagram of the virus detecting apparatus 20. The virus detecting apparatus 20 comprises a CPU 20a, a memory 20b, a storage device 20c such as a magnetic disk, an optical disk, or the like, a transmission-reception device 20d for short-range communication (Bluetooth, IrDA, etc.) with the cellular phone 100, an input device 20e such as a keyboard, a mouse, or the like, and a display device 20f such as a display unit. The CPU 20a, memory 20b, storage device 20c, transmission-reception device 20d, input device 20e, and display device 20f each are connected through bus 20g so as to be able to perform transmission and reception of data between them.

A hardware configuration of the relay server apparatus 30 according to the present embodiment is much the same as the hardware configuration of the virus detecting apparatus 20. Namely, the relay server apparatus 30 comprises a CPU 30a, a memory 30b, a storage device 30c, a transmission-reception device 30d, an input device 30e, and a display device 30f. However, the transmission-reception device 30d is different from that of the virus detecting apparatus 20 in that it performs communication with the cellular phone 100 through the mobile communication network 104.

Figure 4:
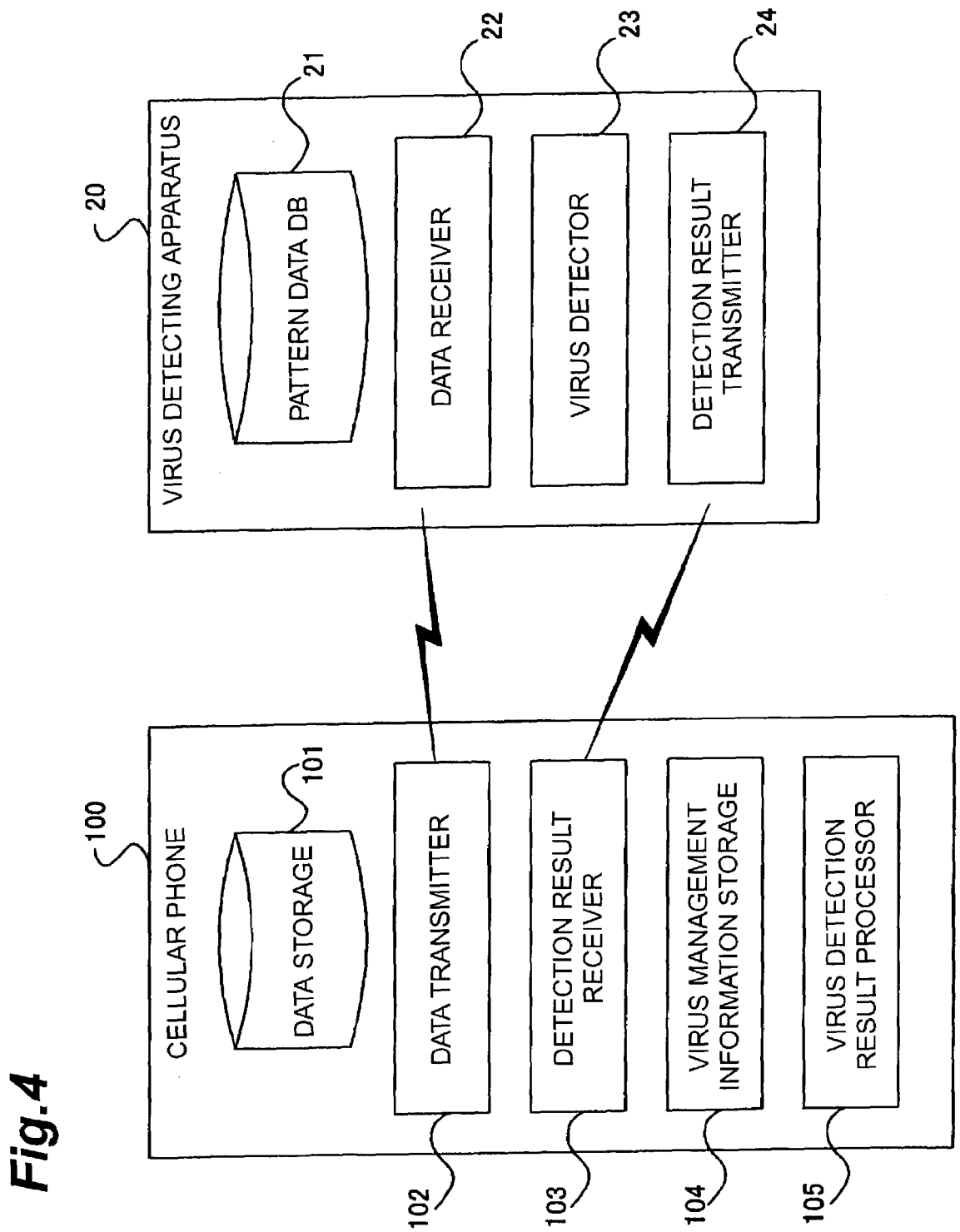
FIG. 4 is a system configuration diagram of the information processing system according to the first embodiment.

FIG. 4 is a system configuration diagram of the cellular phone 100 and the virus detecting apparatus 20. The cellular phone 100 is a mobile communication terminal that transmits and receives data to and from the virus detecting apparatus, and functionally comprises a data storage 101, a data transmitter 102 (transmitting means), a detection result receiver 103 (receiving means), a virus management information storage 104 (storage means), and a virus detection result processor 105. Here the data storage 101 and the virus management information storage 104 correspond to the memory 100b shown in FIG. 2. The data transmitter 102, the detection result receiver 103, and the virus detection result processor 105 are implemented when the CPU 100a executes software stored in the memory 100b shown in FIG. 2.

The virus detecting apparatus 20 is an information processing apparatus for detecting computer viruses, and functionally comprises a pattern data database 21, a data receiver 22, a virus detector 23, and a detection result transmitter 24. In a preferred embodiment, the virus detecting apparatus 20 is touch-panel-operated information terminal equipment (Multi Media Kiosk terminals) installed in shops such as convenience stores or the like. Here the pattern data database 21 corresponds to the memory 20b shown in FIG. 3. The data receiver 22, the virus detector 23, and the detection result transmitter 24 are implemented when the CPU 20a executes software stored in the memory 20b shown in FIG. 3.

Each of the components of the cellular phone 100 will be described below in detail. The data storage 101 stores data (including application programs and data files) as targets for detection of viruses. The data transmitter 102 transmits the data stored in the data storage 101, along with a virus detection request to the virus detecting apparatus 20. The detection result receiver 103 receives the result of detection transmitted from the detection result transmitter 24 of the virus detecting apparatus 20.

The virus management information storage 104 stores the virus management information. FIG. 5 is a configuration diagram of the virus management information storage 104. The virus management information storage 104 stores data names and their virus management information in association with each other. The virus management information herein is information indicating whether the detection process of computer virus was done for data represented by a corresponding data name, and whether the data is infected with a computer virus, if the detection process was done. For example, the virus management information of "OK" indicates that data is infected with no virus, the virus management information of "NG" indicates that data is infected with a virus, and the virus management information of "outstanding" indicates that the detection process of computer virus is not performed yet for data. Although it was described above for convenience' sake of description that the virus management information storage 104 stored the data names for identifying the respective data and the data storage 101 stored the data itself, the virus management information storage 104 may also be arranged to store the data itself.

Returning to FIG. 4, the virus detection result processor 105 stores the detection result received by the detection result receiver 103, in the virus management information storage 104 and notifies the user of the detection result (including display).

Each of the components of the virus detecting apparatus 20 will be described below in detail. The pattern data database 21 stores pattern data being characteristic data strings included in computer viruses (which is also called "pattern files" in the file form). Although it was described above for convenience' sake of description that the pattern data database 21 stored the pattern data itself, it is also possible to employ a configuration wherein the pattern data database 21 stores pointers indicating storage locations of the pattern data and the pattern data itself is stored in the storage locations indicated by the pointers.

The data receiver 22 receives the data transmitted from the data transmitter 102 of the cellular phone 100, with a virus detection request.

The virus detector 23 detects whether the data received by the data receiver 22 includes a computer virus (virus scan), using the pattern data stored in the pattern data database 21. More particularly, the virus detector 23 compares the data received by the data receiver 22, with the pattern data stored in the pattern data database 21, and determines whether the data includes a portion matching the above pattern data. If the data includes a portion matching the above pattern data, the virus detector 23 determines that the data includes a computer virus; if the data includes nothing matching with the above pattern data, the virus detector 23 determines that the data includes no computer virus.

The detection result transmitter 24 transmits the computer virus detection result by the virus detector 23 to the cellular phone 100.

Figure 6:
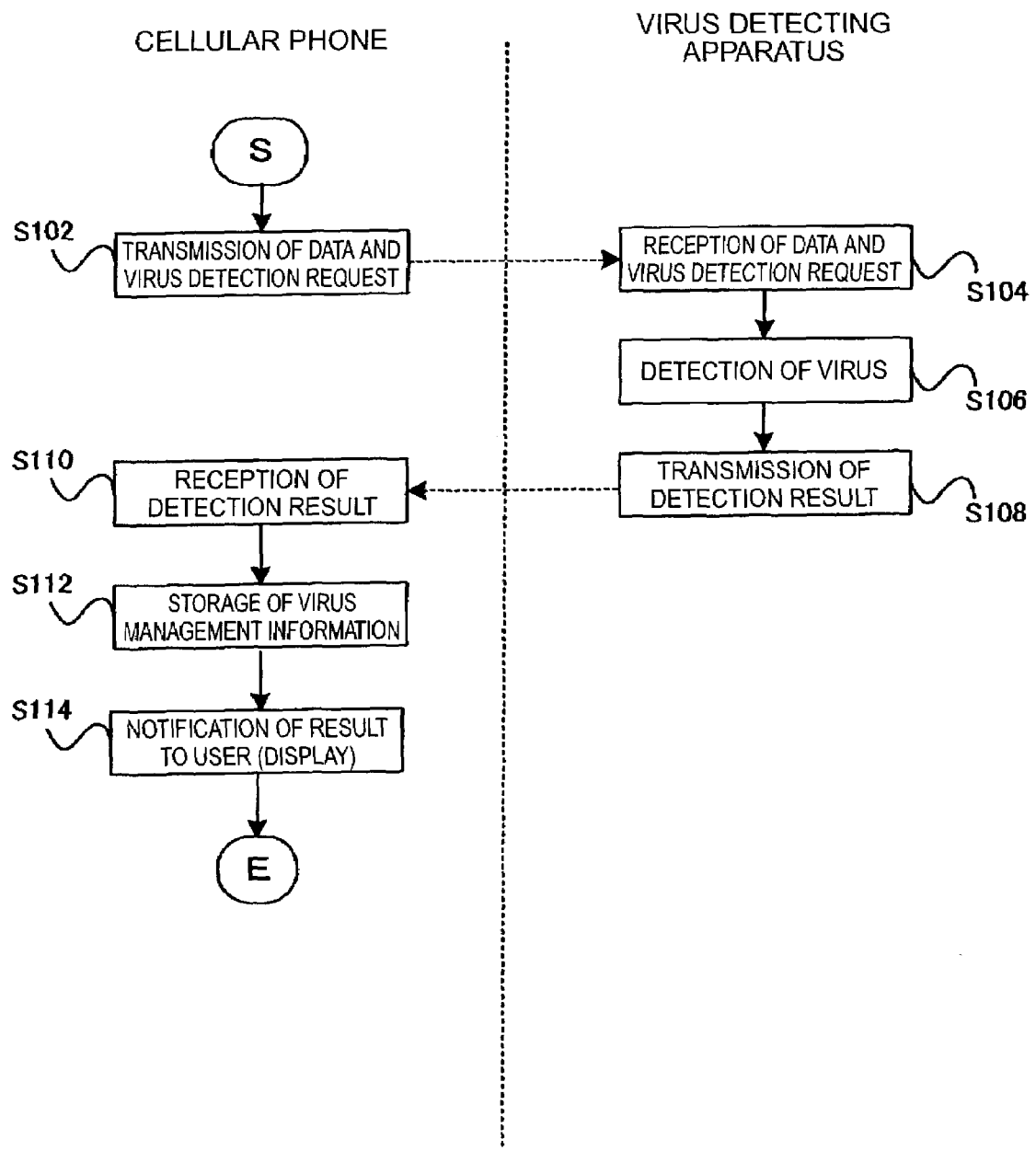
FIG. 6 is a flowchart showing the flow of processing of the information processing system according to the first embodiment.

The following will describe the operation of the information processing system according to the present embodiment and also describe an information processing method according to an embodiment of the present invention. FIG. 6 is a flowchart showing the operation of the information processing system 1 according to the present embodiment. In the information processing system 1 according to the present embodiment, first, the data transmitter 102 transmits data as a target for detection of computer virus along with a virus detection request from the cellular phone 100 to the virus detecting apparatus 20 (S102). The data and virus detection request transmitted from the cellular phone 100 are received by the data receiver 22 of the virus detecting apparatus 20 (S104). The data transmitted from the cellular phone 100 to the virus detecting apparatus 20 may be one explicitly selected by the user, or outstanding data extracted on the basis of the virus management information storage 104.

When the data receiver 22 of the virus detecting apparatus 20 receives the data and virus detection request, the virus detector 23 starts the detection of computer virus (S106). Namely, the virus detector 23 compares the data received by the data receiver 22, with the pattern data stored in the pattern data database 21 and determines whether the received data includes a portion matching the above pattern data. The comparison between the received data and the pattern data may be started at the time of receiving the data, or after a lapse of a fixed time since the reception, or may be started by a command given by the user of the cellular phone 100.

Then the detection result transmitter 24 transmits the computer virus detection result by the virus detector 23 to the cellular phone 100 (S108) The detection result is information indicating whether the data received by the data receiver 22 includes a computer virus. The detection result transmitted is received as virus management information by the detection result receiver 103 of the cellular phone 100 (S110).

The virus detection result processor 105 stores the virus management information in the virus management information storage 104 (S112), and notifies the user of whether a computer virus is present, by display (S114).

The following will describe the action and effect of the information processing system according to the present embodiment. In the information processing system 1 according to the present embodiment, the cellular phone 100 transmits data to the virus detecting apparatus 20 and receives the result of the detection on whether the transmitted data includes a computer virus, as virus management information. Namely, the virus detecting apparatus performs the computer virus detection for the data used in the cellular phone 100. Accordingly, the cellular phone 100 does not have to perform the reception, storage, and comparison of the pattern data involving heavy processing loads. As a consequence, it becomes feasible to efficiently perform the computer virus detection for the data used in the cellular phone 100.

The cellular phone 100 stores the data as a target for the detection of computer virus and the virus management information about the data in association with each other in the data storage 101 and in the virus management information storage 104. Therefore, the cellular phone 100 is able to easily and quickly identify whether a computer virus is present in the data used in the cellular phone 100.

Second Embodiment

The following will describe an information processing system according to the second embodiment of the present invention. The information processing system according to the present embodiment comprises a mobile communication terminal according to the present invention.

First, a configuration of the information processing system according to the present embodiment will be described. A hardware configuration of the information processing system according to the present embodiment is much the same as the hardware configuration of the information processing system 1 according to the above first embodiment described with FIG. 1, FIG. 2, and FIG. 3.

Figure 7:
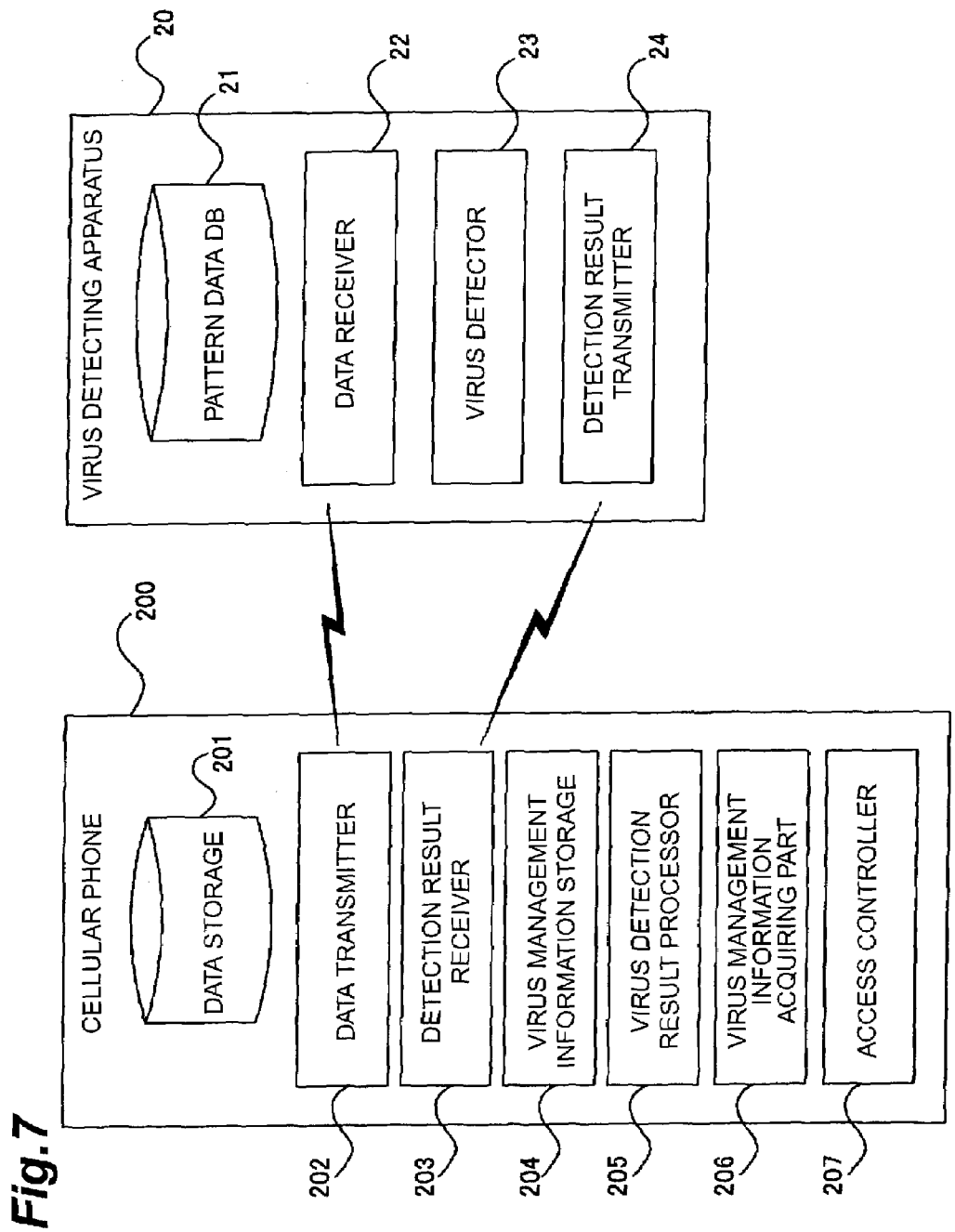
FIG. 7 is a system configuration diagram of the information processing system according to the second embodiment.

FIG. 7 is a system configuration diagram of cellular phone 200 and virus detecting apparatus 20 according to the present embodiment. The cellular phone 200 functionally comprises a data storage 201, a data transmitter 202 (transmitting means), a detection result receiver 203 (receiving means), a virus management information storage 204 (storage means), a virus detection result processor 205, a virus management information acquiring part 206, and an access controller 207 (control means). Here the data storage 201 and virus management information storage 204 correspond to the memory 100b shown in FIG. 2. The data transmitter 202, detection result receiver 203, virus detection result processor 205, virus management information acquiring part 206, and access controller 207 are implemented when the CPU 100a executes software stored in the memory 100b shown in FIG. 2.

Namely, the system configuration of the cellular phone 200 according to the present embodiment is different from that of the cellular phone 100 in that the cellular phone 200 further comprises the virus management information acquiring part 206 and access controller 207. The other components of the data storage 201, data transmitter 202, detection result receiver 203, virus management information storage 204, and virus detection result processor 205 have much the same makeup as the data storage 101, data transmitter 102, detection result receiver 103, virus management information storage 104, and virus detection result processor 105, respectively, in the first embodiment. The system configuration of the virus detecting apparatus according to the present embodiment is much the same as the configuration of the virus detecting apparatus 20 according to the first embodiment. Each of the components of the virus management information acquiring part 206 and access controller 207 will be described below in detail.

When an access is requested to data stored in the data storage 201, the virus management information acquiring part 206 acquires the virus management information corresponding to the access-requested data, using a data name thereof as a key, from the virus management information storage 204.

The access controller 207 controls the access to the data stored in the data storage 201, based on the virus management information acquired by the virus management information acquiring part 206. Specific processing will be described later.

Figure 8:
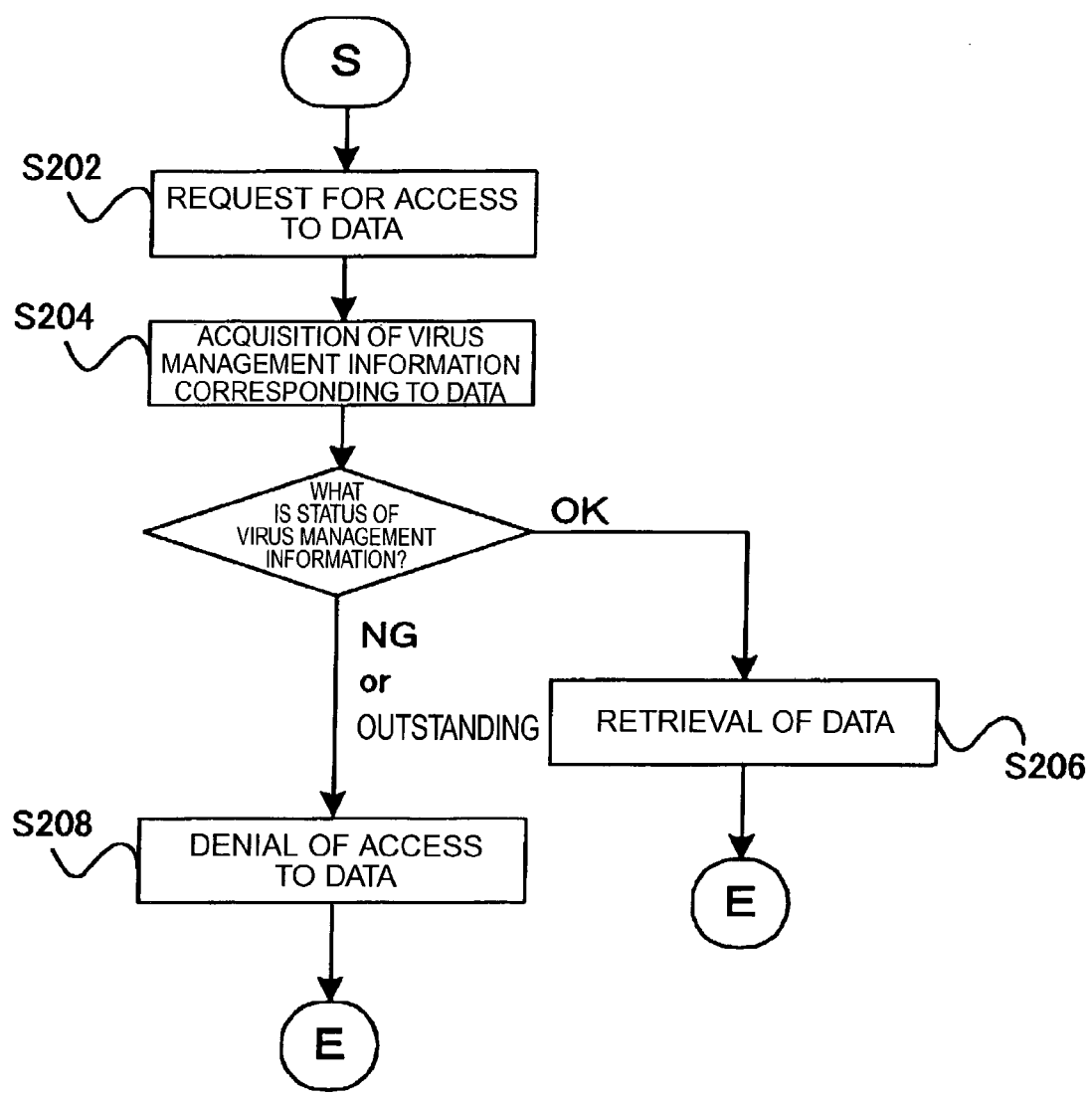
FIG. 8 is a flowchart showing the flow of processing of the virus management information acquiring part and access controller of the information processing system according to the second embodiment.

The following will describe the operation of the virus management information acquiring part 206 and access controller 207 of the cellular phone 200 different from the first embodiment and also describe an information processing method according to the present embodiment. FIG. 8 is a flowchart showing the operation of the virus management information acquiring part 206 and access controller 207 of the cellular phone 200 according to the present embodiment. In the cellular phone 200 according to the present embodiment, first, when a request for an access to data stored in the data storage 201 is received (S202), the virus management information acquiring part 206 acquires the virus management information corresponding to the access-requested data, using its data name as a key, from the virus management information storage 204 (S204).

When the virus management information is "OK," the access controller 207 determines that no computer virus is present in the access-requested data, and retrieves the data (S206). On the other hand, if the virus management information is "NG," the access controller 207 determines that a computer virus is present in the access-requested data, and denies retrieval of the data (S208). On this occasion, a message to notify the user of the cellular phone 200 that the data is infected with a virus may be displayed on the display device 100e. Furthermore, if the virus management information is "outstanding," the access controller 207 determines that the virus detection process is not finished for the access-requested data, and denies retrieval of the data (S208). On this occasion, a message to notify the user of the cellular phone 200 that the data can be infected with a virus may be displayed on the display device 100e.

The following will describe the action and effect of the information processing system according to the present embodiment. The cellular phone 200 according to the present embodiment achieves the following effect, in addition to much the same effect as the action and effect described in the first embodiment. The access controller 207 controls the access to the data stored in the data storage 201, based on the virus management information stored in the virus management information storage 204. Namely, the access controller 207 denies an access to data whose virus management information indicates inclusion of a computer virus or to data whose virus management information indicates that the process of detecting whether a computer virus is included is outstanding. On the other hand, the access controller 207 permits an access to data whose virus management information indicates no computer virus included. Therefore, it is feasible to prevent the access to and retrieval of data infected with a computer virus or data that can be infected with a computer virus. As a consequence, the spread of computer viruses can be prevented.

Third Embodiment

Finally, an information processing system according to the third embodiment of the present invention will be described. The information processing system according to the present embodiment comprises a mobile communication terminal, a relay server apparatus, and a server apparatus according to the present invention.

First, a configuration of the information processing system according to the present embodiment will be described. A hardware configuration of the information processing system according to the present embodiment is much the same as the hardware configuration of the information processing system 1 according to the above first embodiment described with FIGS. 1, 2, and 3.

Figure 9:
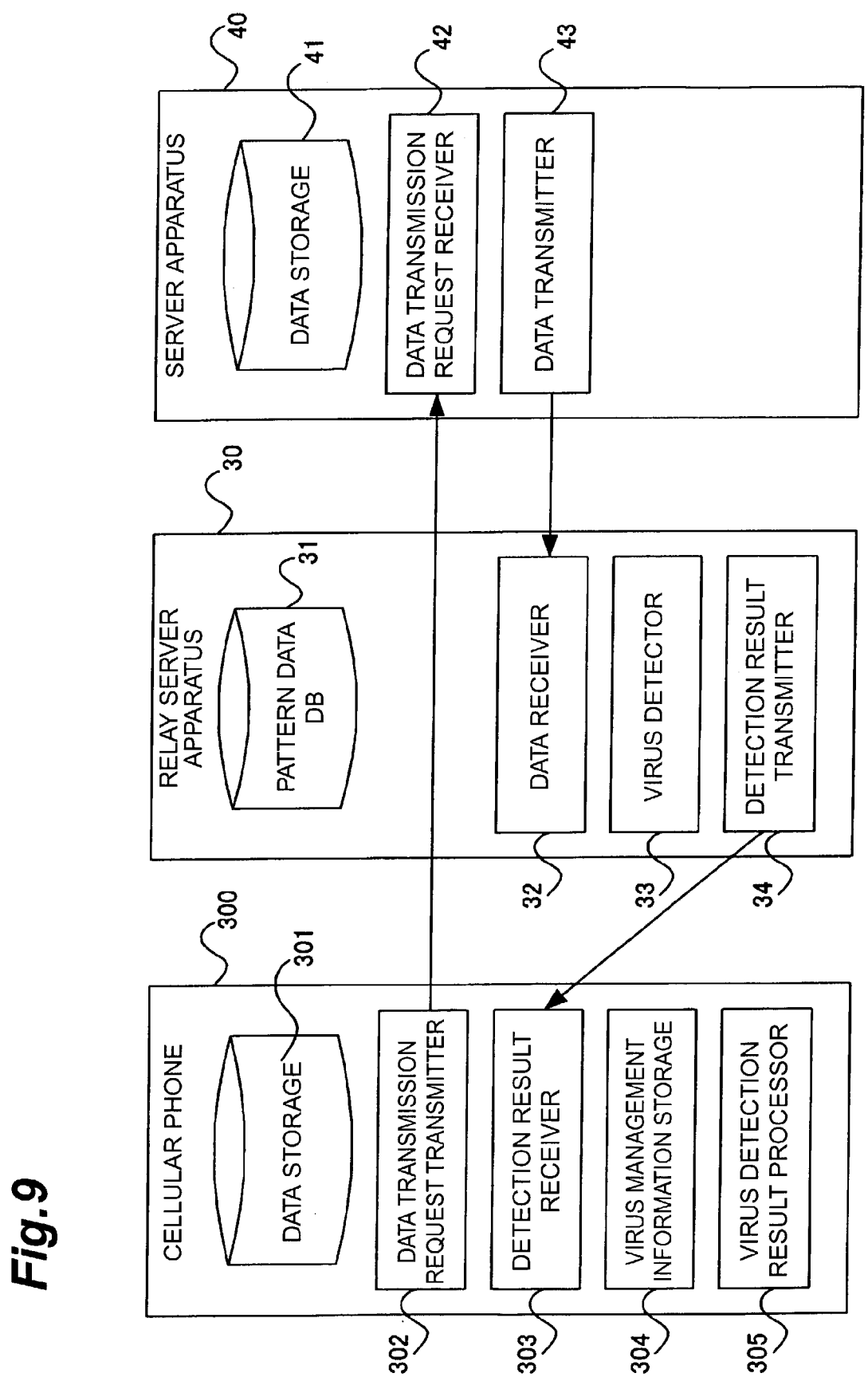
FIG. 9 is a system configuration diagram of the information processing system according to the third embodiment.

FIG. 9 is a system configuration diagram of the cellular phone 300, the relay server apparatus 30, and the server apparatus 40. The cellular phone 100 is a mobile communication terminal which receives data through the relay server apparatus 30 from the server apparatus 40, and functionally comprises a data storage 301, a data transmission request transmitter 302, a detection result receiver 303 (receiving means), a virus management information storage 304 (storage means), and a virus detection result processor 305. Here the data storage 301 and virus management information storage 304 correspond to the memory 100*b* shown in FIG. 2. The data transmission request transmitter 302, the detection result receiver 303, and the virus detection result processor 305 are implemented when the CPU 100*a* executes software stored in the memory 100*b* shown in FIG. 2.

The relay server apparatus 30 is a relay server apparatus for detecting a computer virus about data received from the server apparatus 40, and functionally comprises a pattern data database 31, a data receiver 32, a virus detector 33 (detecting means), and a detection result transmitter 34 (transmitting means). Here the pattern data database 31 corresponds to the memory 30*b*. The data receiver 32, virus detector 33, and detection result transmitter 34 are implemented when the CPU 30*a* executes software stored in the memory 30*b*.

Each of the components of the cellular phone 300 will be described below in detail. The data storage 301 stores data as targets for detection of viruses. The data transmission request transmitter 302 transmits a data transmission request to the server apparatus 40. The detection result receiver 303 receives data and its detection result transmitted from the detection result transmitter 34 of the relay server apparatus 30.

The virus management information storage 304 has the same configuration as the virus management information storage 104 according to the first embodiment. Namely, as shown in FIG. 5, the virus management information storage 304 stores data names and their virus management information in association with each other.

Returning to FIG. 9, the virus detection result processor 305 performs a warning process to the user of the cellular phone 300, prohibition of processing of data, etc., based on predetermining setting information, when the detection result received by the detection result receiver 303 provides a decision that a computer virus is included in the data. When the data is stored in the data storage 301 on the basis of a decision that no computer virus is included in the data, the virus management information is stored in association with the data in the virus management information storage 304.

Each of the components of the relay server apparatus 30 will be described below in detail. The pattern data database 31 stores pattern data being characteristic data strings included in computer viruses. It was described above for convenience' sake of description that the pattern data itself was stored in the pattern data database 31, but it is also possible to employ a configuration wherein the pattern data database 31 stores pointers indicating storage locations of the pattern data and the pattern data itself is stored in the storage locations indicated by the pointers.

The data receiver 32 receives data transmitted from the data transmitter 43 of the server apparatus 40. The virus detector 33 detects whether a computer virus is included in the data received by the data receiver 32 (virus scan), using the pattern data stored in the pattern data database 31. More particularly, the virus detector 33 compares the data received by the data receiver 32, with the pattern data stored in the pattern data database 31, and determines whether the data includes a portion matching the pattern data. Here the virus detector 33 determines that the data includes a computer virus if the data includes a portion matching the above pattern data; whereas the virus detector 33 determines that the data includes no computer virus if the data has nothing matching the above pattern data.

The detection result transmitter 34 transmits the data received by the data receiver 32 and the computer virus detection result by the virus detector 33 to the cellular phone 300.

The server apparatus 40 is a server apparatus for transmitting data to the relay server apparatus 30, and functionally comprises a data storage 41, a data transmission request receiver 42, and a data transmitter 43. Each of the components will be described below in detail.

The data storage 41 stores data (including application programs and data files) to be transmitted to the cellular phone 300. The data transmission request receiver 42 receives a data transmission request transmitted by the data transmission request transmitter 302 of the cellular phone 300. The data transmitter 43 transmits the data stored in the data storage 41 and the detection result via the relay server apparatus 30 to the cellular phone 300.

Figure 10:
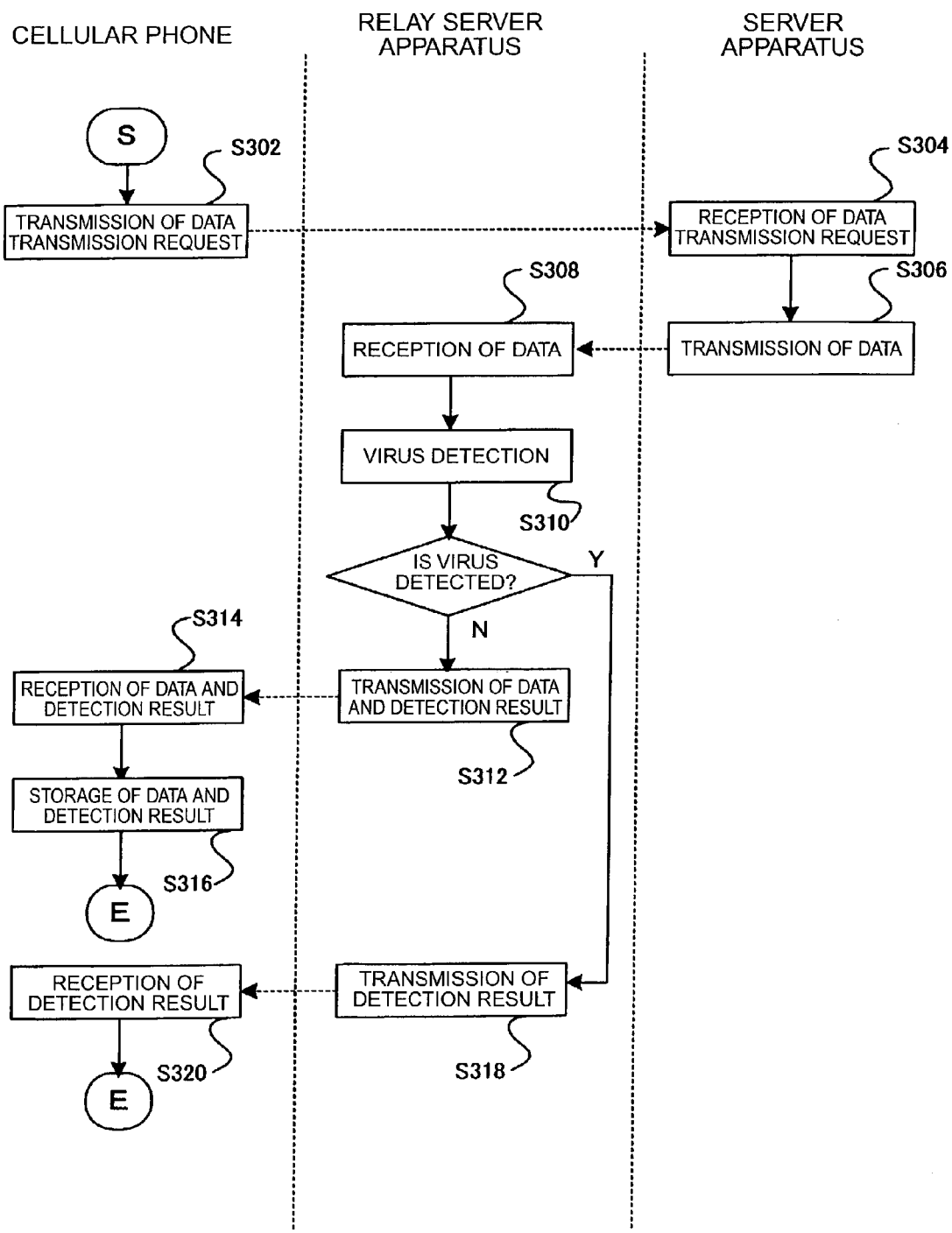
FIG. 10 is a flowchart showing the flow of processing of the information processing system according to the third embodiment.

The following will describe the operation of the information processing system according to the present embodiment and also describe an information processing method according to an embodiment of the present invention. FIG. 10 is a flowchart showing the operation of the cellular phone, relay server apparatus, and server apparatus according to the present embodiment. In the information processing system according to the present embodiment, first, the data transmission request transmitter 302 of the cellular phone 300 transmits a data transmission request from the cellular phone 300 to the server apparatus 40 (S302). The data transmission request transmitted from the cellular phone 300 is received by the data transmission request receiver 42 of the server apparatus 40 (S304).

When the data transmission request receiver 42 of the server apparatus 40 receives the data transmission request, the transmission-requested data is retrieved from the data storage 41 and the data transmitter 43 transmits the data to the relay server apparatus 30 (S306). The transmitted data is received by the data receiver 32 of the relay server apparatus 30 (S308).

When the data receiver 32 of the relay server apparatus 30 receives the data, the virus detector 33 starts the computer virus detection for the data (S310). Specifically, the virus detector 33 compares the data received by the data receiver 32, with the pattern data stored in the pattern data database 31, and determines whether the received data includes a portion matching the above pattern data.

When the result of the comparison by the virus detector 33 is that the data received by the data receiver 32 includes no portion matching the above pattern data, it is determined that the above data includes no computer virus, and the detection result transmitter 34 transmits the data and detection result to the cellular phone 300 (S312). The detection result thus transmitted is received as virus management information by the detection result receiver 303 of the cellular phone 300 (S314).

The data and the virus management information received by the detection result receiver 303 is stored in the data storage 301 and in the virus management information storage 304, respectively (S316). The data and virus management information is stored in association with each other, using a data name as a key.

On the other hand, when the result of the comparison by the virus detector 33 is that the data received by the data receiver 32 includes a portion matching the above pattern data, it is determined that the data includes a computer virus, and the detection result transmitter 34 transmits the detection result to the cellular phone 300 (S318). In this case, the data is not transmitted, in order to prevent infection of the cellular phone 300 with the computer virus. The detection result transmitted is received as virus management information by the detection result receiver 303 of the cellular phone 300 (S320).

The following will describe the action and effect of the information processing system according to the present embodiment. With the cellular phone 300, the relay server apparatus 30, and the server apparatus 40 according to the present embodiment, the cellular phone 300, when receiving the data from the relay server apparatus 30, receives the detection result on whether the received data includes a computer virus, as virus management information. Namely, the relay server apparatus 30 performs the computer virus detection about the data used in the cellular phone 300. Accordingly, the cellular phone 300 does not have to perform the reception, storage, and comparison of the pattern data involving heavy processing loads. As a consequence, it is feasible to efficiently perform the computer virus detection for the data used in the cellular phone 300. The present embodiment may be arranged so that the virus management information received by the cellular phone 300 is used to notify that the process of detecting whether the data includes a computer virus is outstanding, for the data received by the cellular phone 300.

The relay server apparatus and the server apparatus forming the information processing system according to the present embodiment were arranged as physically separate devices, but may be arranged as a physically single server device. Conversely, the components of the relay server apparatus may be spread among a plurality of server devices. Similarly, the components of the server apparatus may be spread among a plurality of server devices.

The second embodiment described the information processing system obtained by adding the virus management information acquiring part 206 and the access controller 207 to the information processing system according to the first embodiment, and it is also possible to add the virus management information acquiring part and the access controller described in the second embodiment, to the information processing system according to the third embodiment. This permits the cellular phone 300 to control access to the data received from the relay server apparatus 30, based on the virus management information.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication terminal comprising:
    a transmitting unit configured to transmit data to an information processing apparatus, the information processing apparatus being configured to detect whether a computer virus is contained in the data;
    a receiving unit configured to receive a detection result indicating whether the data transmitted by the transmitting unit includes a computer virus or not according to virus management information from the information processing apparatus;
    a storage unit configured to store data transmitted by the transmitting unit, in association with virus control information which indicates when the computer virus is "Outstanding" or detection process results received by the receiving unit; and
    a control unit configured to permit retrieval of the data when the virus management information is "OK," thereby indicating that the data does not include a virus, and for disallowing retrieval of the data when the virus management information is "NG," thereby indicating that the data is infected with a virus or when the virus management information is "Outstanding," indicating that the computer virus detection process has not been performed for the data,
    wherein when a detection result is received by the receiving unit, corresponding virus management information is automatically updated in the storage unit.

2. The mobile communication terminal of claim 1, wherein the mobile communication terminal is a cellular phone.

3. The mobile communication terminal of claim 1, wherein the transmitting unit is configured to perform short-range wireless communications.

4. The mobile communication terminal of claim 3, wherein the transmitting unit performs short-range wireless communications with the information processing apparatus and remote data communications with a relay server.

5. An information processing method of processing data of a mobile communication terminal, the information processing method comprising:
    transmitting data from the mobile communication terminal to an information processing apparatus, said information processing apparatus being configured to detect whether a computer virus is contained in the data;
    receiving a detection result indicating whether the data transmitted by the mobile communication terminal includes a computer virus or not according to virus management information from the information processing apparatus;
    storing data transmitted by the mobile communication terminal, in association with virus control information which indicates when the computer virus is "Outstanding" or detection process results received by the mobile communication terminal; and
    permitting retrieval of the data when the virus management information is "OK," thereby indicating that the data does not include a virus, and disallowing retrieval of the data when the virus management information is "NG," thereby indicating that the data is infected with a virus or when the virus management information is "Outstanding," indicating that the computer virus detection process has not been performed for the data,
    wherein when a detection result is received by the mobile communication terminal, corresponding virus management information is automatically updated.

6. The method of claim 5, wherein the mobile communication terminal is a cellular phone.

7. The method of claim 5, further comprising:
    performing short-range wireless communications with external devices.

8. The method of claim 5, further comprising:
    performing short-range wireless communications with the information processing apparatus; and
    exchanging the data with a relay server over a mobile communication network.

* * * * *